March 20, 1956  A. E. COREY ET AL  2,739,042
PROCESS FOR THE PRODUCTION OF HYDROGEN PEROXIDE
Filed Jan. 12, 1954
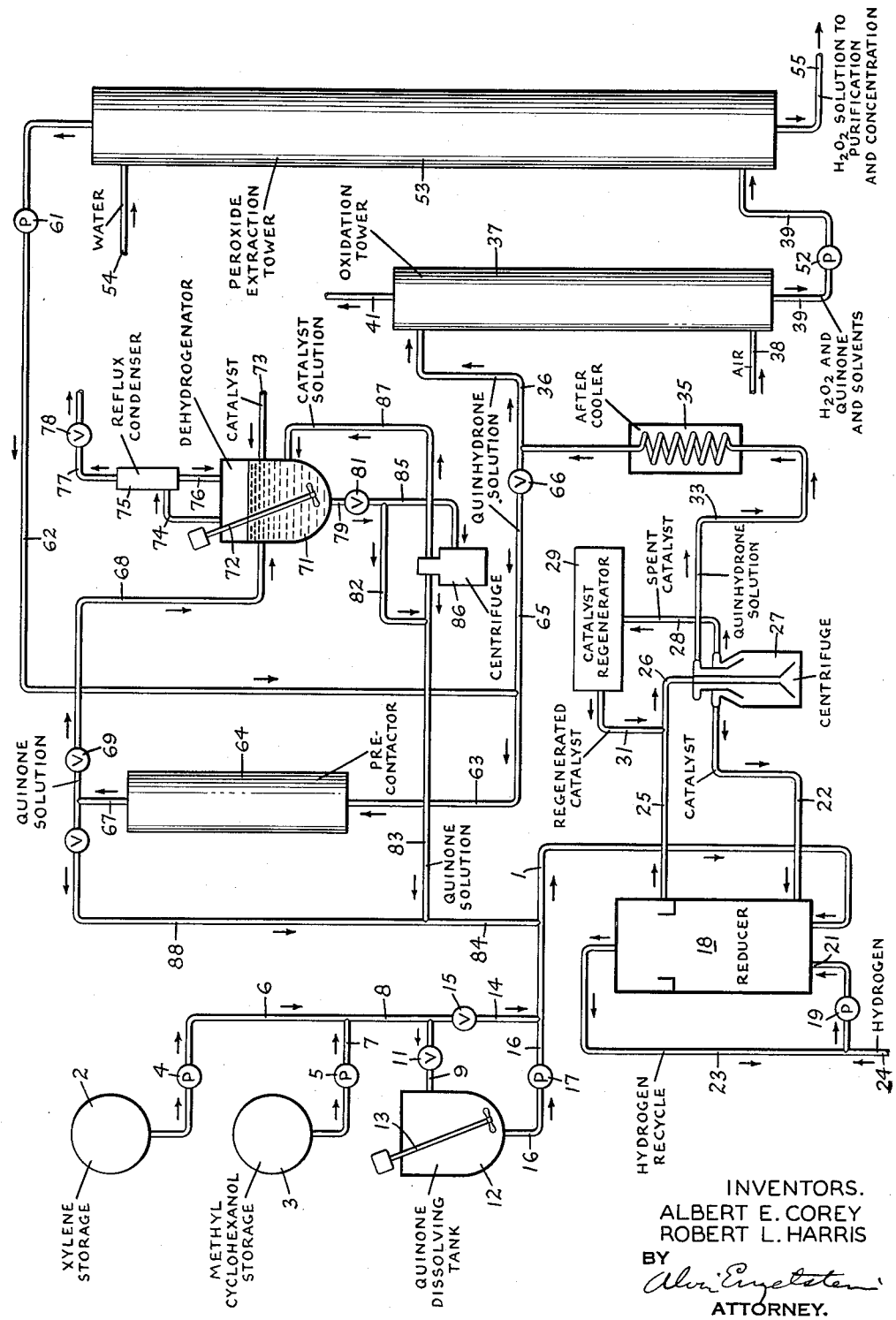
INVENTORS.
ALBERT E. COREY
ROBERT L. HARRIS
BY
ATTORNEY.

United States Patent Office 2,739,042
Patented Mar. 20, 1956

2,739,042

PROCESS FOR THE PRODUCTION OF HYDROGEN PEROXIDE

Albert E. Corey and Robert L. Harris, Morristown, N. J., assignors to Allied Chemical & Dye Corporation, New York, N. Y., a corporation of New York Application January 12, 1954, Serial No. 403,528

9 Claims. (Cl. 23—207)

This invention relates to the production of hydrogen peroxide and more particularly refers to a new and improved process for the production of hydrogen peroxide by a cyclic operation involving the reduction of an anthraquinone and oxidation of the resultant anthrahydroquinone.

The anthraquinone process for the production of hydrogen peroxide consists of hydrogenating the quinone compound and oxidizing the hydroquinone compound thus formed back to the initial quinone compound. The hydrogen added to the quinone molecule is removed as hydrogen peroxide. During the hydrogenation step a side reaction leads to the addition of hydrogen to the aromatic nucleus of anthroquinone forming tetrahydroanthraquinone. This tetrahydroanthraquinone compound formed in a side reaction during the hydrogenation step may be used as a working compound in the hydrogen peroxide process. However, the oxidation of the tetrahydroanthrahydroquinone compound proceeds with greater difficulty than the oxidation of anthrahydroquinone. Also the hydrogenation of tetrahydroanthraquinone proceeds at a lower rate than the hydrogenation of anthraquinone. In the course of cycling the quinone compound to and from the hydrogenation and oxidation steps, the anthraquinone compound is gradually converted to tetrahydroanthraquinone with consequent reduction in amount of the former and build-up of the latter thereby materially reducing the rate of oxidation and hydrogenation with resultant loss in capacity for production of hydrogen peroxide.

An object of the present invention is to provide a more efficient method of producing hydrogen peroxide in the cyclic process involving reduction and oxidation of a quinone compound.

Another object of the present invention is to provide a method for minimizing the amount of tetrahydroanthraquinone formed in the cyclic process of hydrogenating and oxidizing a quinone compound for the production of hydrogen peroxide.

A further object of the invention is to provide a method for maintaining high reaction rates during steps of hydrogenation and oxidation of quinone compounds in the cyclic process for production of hydrogen peroxide.

Other objects and advantages of the invention will be apparent from the following description and accompanying drawing.

In accordance with the present invention hydrogen peroxide is continuously produced by a cyclic process involving hydrogenating a working solution comprising an alkylated anthraquinone dissolved in a solvent to convert the anthraquinone to the hydroquinone with concomitant formation as a side reaction of tetrahydroanthraquinone resulting from the addition of hydrogen to the aromatic nucleus of the anthraquinone, subjecting the hydrogenated working solution to oxidation with elemental oxygen in the form of pure oxygen or a gas containing elemental oxygen to produce anthraquinone and hydrogen peroxide, separating hydrogen peroxide from the working solution, heating the working solution in the presence of a catalyst and in the absence of hydrogen to convert the tetrahydroquinone back to the anthraquinone and recycling resultant working solution for further hydrogenation.

In the cyclic process for the production of hydrogen peroxide, the working solution generally consists of about 10% quinone compound and 90% solvent. At the end of each cycle which includes hydrogenation and oxidation there is produced approximately 1% by weight hydrogen peroxide based on the working solution. Because of this low yield per pass it has been found necessary to recycle the working solution at least 1,000 times to obtain results of practical commercial utility. In each cycle of operation a small amount of the aromatic nucleus of the anthraquinone is hydrogenated to form the tetrahydroanthraquinone, which latter compound is more stable than the former and consequently accumulates in the working solution during the thousand or more cycles, displacing the anthraquinone. Although the tetrahydroanthraquinone formed in a side reaction during the hydrogenation step may be used as a working compound in the hydrogen peroxide process, unfortunately the oxidation of the tetrahydroanthrahydroquinone proceeds at a rate of approximately one-third to one-fourth the rate at which the anthrahydroquinone oxidizes. Similarly, the hydrogenation of tetrahydroanthraquinone proceeds at a much slower rate, about one-half the rate of anthraquinone. In an operation involving about 1,000 cycles, the overall effect of this side reaction producing tetrahydroanthraquinone is to cut the oxidation and hydrogenation reaction rate to approximately half. Thus the importance of maintaining little or no tetrahydroanthraquinone in the working solution without loss of anthraquinone will be evident. The suggestion has been made to permit tetrahydroanthraquinone to build up in the working solution to a high concentration wherein some of it will become insoluble and crystallize out, and the insoluble portion may then be filtered off. But this procedure is inefficient in that large quantities of tetrahydroanthraquinone remain in the working solution, the separation of the tetrahydroanthraquinone results in loss of valuable anthraquinone and separating the tetrahydroanthraquinone from the working solution is difficult.

The extent to which tetrahydroanthraquinone is formed and the effect of such tetrahydroanthraquinone on the oxidation and hydrogenation reactions are illustrated in the following examples:

*Example 1.*—Eight hundred ml. of a 10% solution of ethylanthraquinone in an equivolume mixture of xylene and methylcyclohexanol was repeatedly subjected to: (a) hydrogenation catalyzed by 10 g. of Raney nickel, (b) oxidation with oxygen, (c) aqueous extraction of the $H_2O_2$ product, and (d) a treatment with a nickel-silver decomposition catalyst to remove residual traces of $H_2O_2$. After the solution had been through the four-step cycle twenty-five times, analysis of the solute showed that it contained 61% tetrahydroquinone.

*Example 2.*—In a similar experiment 450 ml. of a 10% solution of ethylanthraquinone in an equivolume mixture of xylene and methylcyclohexanol was subjected to Raney nickel catalytic hydrogenation and the other three steps of the cyclic process a total of 15 times. Analysis of the solute showed that 20% of the original ethylanthraquinone had been converted to the tetrahydro form.

In an operation similar to Examples 1 and 2 employing a palladium hydrogenation catalyst in lieu of the nickel catalyst the ethylanthraquinone was converted to the tetrahydro form in substantial amounts although not as rapidly as when employing the nickel catalyst.

*Example 3.*—Two 10% solutions, one containing ethylanthraquinone and one containing tetrahydroquinone, were prepared with equivolume amounts of xylene and methyl cyclohexanol. Both solutions were hydrogenated in the presence of a nickel catalyst and subsequently oxidized under identical conditions and the rates of hydrogenation and oxidation were measured. The results are tabulated below:

| Temp., °C. | EAQ:THQ, Relative Rates of Hydrogenation | EAHQ:THHQ, Relative Rates of Oxidation |
|---|---|---|
| 30 | 3.0 | 2.8 |
| 50 | 2.1 | 3.7 |

The foregoing tests demonstrate that ethylanthraquinone hydrogenates at a rate about two to three times faster than the tetrahydroquinone and also the oxidation is at a rate of approximately three to four times faster.

*Example 4.*—Two oxidations were carried out in a packed column to determine the relative oxidation rates of ethylanthrahydroquinone and tetrahydroethylanthrahydroquinone. The operation was continuous, the solution pumped through the column countercurrent to air. Both solutions were made up as 10% solutions in equivolum mixtures of xylene and methyl cyclohexanol. The essential data for the two runs are tabulated below:

| Solute | Solution Feed, L./hr. | Air Feed, L./min. | Hold-up, L. | Residence Time, Min. |
|---|---|---|---|---|
| EAHQ | 11.7 | 4.0 | 0.485 | 2.5 |
| THHQ | 1.5 | 4.0 | 0.283 | 11.1 |

The ratio of the air oxidation rate of EAHQ to that of THHQ as measured by the residence time is 4.4 to 1.

Referring to the drawing diagrammatically illustrating one method of carrying out the present invention, the working solution fed into the system through line 1 is a quinone compound, preferably an alkylated anthraquinone dissolved in a solvent, desirably a mixed solvent of two constituents consisting of a constituent capable of dissolving the quinone form and a constituent capable of dissolving the hydroquinone form of the working material. The result of employing more than one constituent in the solvent is that the working material in solution can be oxidized and reduced in cyclic fashion in single phase without separation of either form of the working material which are solids at the temperature of the process. The quinone compounds which may be employed for hydrogenation and oxidation to produce hydrogen peroxide are generally known in the art and include anthraquinone and derivatives of anthraquinone such as methyl-, ethyl-, propyl-, butyl-, chloro-, and bromo-anthraquinones. The solvents should desirably have the following properties: (*a*) a large dissolving power; (*b*) a low vapor pressure; (*c*) insoluble in water; and (*d*) inert under the conditions of reaction. Aromatic compounds such as benzene, toluene and xylene are examples of the solvent constituent suitable for maintaining the anthraquinone compound in solution. Alcohols having from about 5 to 12 carbon atoms in the molecule, as for example amyl alcohol, cyclohexanol, methyl cyclohexanol, dimethyl cyclohexanol, octyl alcohol, nonyl alcohol and decyl alcohol may be employed as the solvent constituent for maintaining the anthrahydroquinone compound in solution.

In the drawing, xylene from storage tank 2 and methyl cyclohexanol from storage tank 3 are sent by pumps 4 and 5 through respective lines 6 and 7, through lines 8, 9 and valve 11 into quinone dissolving tank 12 equipped with stirrer 13 wherein xylene, methyl cyclohexanol, and 2-ethyl anthraquinone are mixed in the proportion of about 50:50:10 to produce a working solution for the process. During the operation a small amount of one or both of the solvents may be lost due to mechanical losses or evaporation, in which event the proper proportion of solvent in the working solution is maintained by introducing xylene or methyl cyclohexanol into the system through line 14 and valve 15. Normally, such losses are very small amounting usually to less than 1% during an operation.

The ethylanthraquinone-solvent mixture termed working solution discharges from the bottom of tank 12 through line 16 and is directed by pump 17 through line 1 into the bottom of reducer chamber 18 maintained at temperature within the range of about 20–50° C., preferably within the range of about 25–30° C. and under substantially atmospheric pressure of about 1–5 p. s. i. g. Simultaneously the hydrogen is forced by pump 19 through line 21 into the bottom of reducer 18 wherein it passes upwardly in intimate contact with the body of working solution containing suspended catalyst entering through line 22. Unreacted hydrogen released from the top of chamber 18 is recycled via lines 23 and 21. Make-up hydrogen is added through line 24. The primary hydrogenation reaction in which the alkylated quinone is reduced to the alkylated hydroquinone may be represented by the following equation:

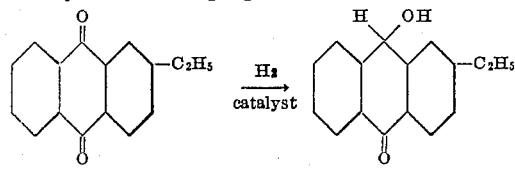

The hydrogenation in reducer 18 is usually permitted to proceed until at least one-half of the possible amount of the hydroquinone is formed, that is, the rate at which the working solution moves through hydrogenator 18 is such as to maintain at least half of the material, preferably 70–90%, in the hydrogenated state and the remainder in the oxidized state. The time of reaction for effecting hydrogenation of the quinone compound has usually been found to be no greater than a half hour. The hydrogenation reaction is exothermic and causes the temperature of the working solution to rise about 5–10° C. Under the mild hydrogenation conditions the hydroquinone compound slowly reacts further with hydrogen to form tetrahydroethylanthraquinone—roughly about 0.5% of the quinone is converted to the tetrahydro form. The tetrahydro compound oxidizes more slowly and hence is detrimental to the process. Hydrogenation at higher temperatures and pressures, although desirable because they speed up the reaction, have the disadvantage of increasing the rate of formation of the tetrahydro compound. In the present invention wherein the tetrahydro compound is reconverted to the anthraquinone, the use of strenuous hydrogenation reaction conditions may be advantageously utilized.

The catalyst may be one or a mixture of various known hydrogenation catalysts such as nickel, palladium, platinum, iron and silver. The two hydrogenation catalysts most commonly used are nickel and palladium, which catalysts are usually dispersed on solid supports. The amount of catalysts required is approximately 5–10% by weight of the quinone present.

The hydrogenated solution containing suspended catalyst is discharged from reducer 18 through lines 25 and 26 into centrifuge 27 wherein the catalyst is separated from the solution and returned via line 22 to reducer 18. Spent catalyst may be directed through line 28 to conventional catalyst regenerator 29 and returned via line 31 to centrifuge 27.

The working solution after removal of catalyst flows through line 33 into after-cooler 35 wherein some of the exothermic heat of reaction resulting from hydrogenation is removed by indirect heat exchange with cooling water and the cooled working solution introduced through line 36 into oxidation tower 37 which may be one or a plurality of towers connected in series. The oxidation stage where the alkylated hydroquinone is oxidized to the quinone, hydrogen peroxide splitting off during this reaction, may be exemplified by the following reaction:

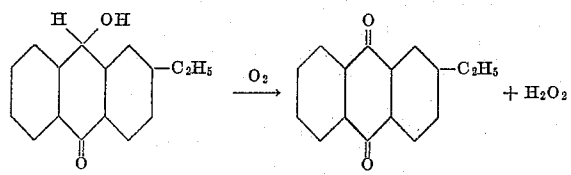

The oxidation of the hydroquinone is performed in relatively the same manner as the reduction of the quinone. Oxygen or air entering through line 38 is bubbled through the hydrogenated solution in tower 37 at room temperatures or higher, preferably about 30–35° C. A catalyst is not necessary for the oxidation reaction. Oxidation is carried out in tower 37 to effect substantially complete conversion of the hydroquinone compounds to the quinone compounds, resulting in a working solution containing about 1% hydrogen peroxide which is withdrawn from the bottom of tower 37 through line 39. Uncondensed gases such as nitrogen and unreacted oxygen are released from the top of oxidation tower 37 through line 41.

The products of the oxidation reaction are sent by pump 52 through line 39 into the bottom of peroxide extraction tower 53 and pass upwardly through the extraction tower countercurrent to a downwardly flowing stream of water entering through line 54. The water solution containing about 10–20% dissolved hydrogen peroxide together with small amounts of impurities is withdrawn through line 55 from the bottom of tower 53 and may, if a purer and more concentrated solution is required, be subjected to further purification and fractionation.

The working solution removed from the top of extraction tower 53 through line 62 contains some hydrogen peroxide as an impurity which tends to poison the hydrogenation catalyst particularly if the catalyst employed is nickel. To remove these traces of hydrogen peroxide, the working solution is sent by pump 61 through lines 62 and 63 into precontactor chamber 64 passing upwardly in contact with a nickel-silver catalyst which causes the hydrogen peroxide to decompose catalytically liberating oxygen. In order to take up the liberated oxygen, a portion of the quinhydrone, about 10% of the working solution leaving reducer 18, is by-passed after cooler 35 and sent through line 65, valve 66, and line 63 to precontactor 64. Working solution free of hydrogen peroxide is discharged from precontactor 64 through line 67.

As previously mentioned the working solution contains tetrahydroquinone formed as a side reaction during the hydrogenation of the quinone in reducer 18. Tetrahydroquinone in the working solution may be reconverted to the anthraquinone by catalytic dehydrogenation. Dehydrogenation of the tetrahydroquinone may be accomplished by heating the working solution in the presence of a catalyst such as palladium and platinum. Although the dehydrogenation reaction is preferably carried out in the complete absence of hydrogen, the reaction proceeds in the presence of minor amounts of hydrogen, substantial absence of hydrogen, i. e., a low concentration of hydrogen of the order of a few mole percent. The preferred dehydrogenation catalyst is palladium because of its high activity and because the palladium catalyst need not be separated from the working solution but may be utilized as the catalyst for effecting hydrogenation in the presence of a high concentration of hydrogen in reducer 18. All or a portion of the working solution leaving precontactor 64 may be sent through lines 67, 68 and valve 69 into dehydrogenator 71 equipped with stirrer 72 and provided with heating means such as a steam jacket or a steam coil not shown in the drawing. Catalyst is introduced into contact with the working solution through line 73. Since higher temperatures favor increased rate of reaction, the temperature in dehydrogenator 71 is preferably in excess of 100° C., preferably within the range of 150–250° C. Excessively high temperatures which tend to cause decomposition of the working solution should be avoided. Vapors and gases evolved during the heating of the working solution in chamber 71 pass upwardly through line 74 into reflux condenser 75 wherein the vapors are condensed and returned to dehydrogenator 71 via reflux line 76. Uncondensed gases are released from the top of reflux condenser 75 through line 77 and valve 78. Superatmospheric pressure may be maintained on chamber 71 by controlling the opening of valve 78. Alternate chambers 71 may be employed to permit continuity of operation.

In practice we have found that the dehydrogenation reaction in chamber 71 proceeds rather rapidly initially and at appreciably slower rates when the concentration of tetrahydroquinone in the working solution is lower and have therefore found it inexpedient to attempt to convert the last traces of tetrahydroquinone to the quinone form. For practical economy we have found it desirable to maintain in the working solution circulating through the system a concentration of at least 5% but not more than about 10% tetrahydroquinone based on the total quinone component. Further, we have found it desirable to bleed off through line 68 only about 25–50% of the working solution and subjecting that portion to dehydrogenation in chamber 71 in order to maintain a circulating working solution having a content of less than 10% tetrahydroquinone. The dehydrogenated working solution may be discharged from the bottom of chamber 71 through line 79 and valve 81 and sent directly to reducer 18 via lines 82, 83 and 84. However, if the catalyst for effecting dehydrogenation is different than the catalyst employed in reducer 18, then the working solution should be directed through line 85 into centrifuge 86 to effect separation of the catalyst, which latter is returned to chamber 71 via line 87 and the clarified working solution from the centrifuge directed via lines 83 and 84 to reducer 18. That portion of the working solution leaving the top of precontactor 64 which is not subjected to dehydrogenation is sent through lines 67, 88 and 84 to reducer 18.

*Example 5* as follows illustrates the present invention: A working solution consisting of 10% ethylanthraquinone, 45% xylene and 45% methylcyclohexanol to which is added 8% of Raney nickel catalyst based on the weight of ethylanthraquinone is maintained under agitation at 30° C. and 4 p. s. i. g. and hydrogen passed in contact with the working solution until 75% of the ethylanthraquinone is converted to ethylanthrahydroquinone.

The catalyst is separated from the hydrogenated solution by centrifuging and filtering and the filtered solution placed in an oxidation tower wherein air is bubbled through the solution maintained at a temperature of 35° C. until substantially all of the ethylanthrahydroquinone is converted to ethylanthraquinone.

The oxidized working solution is scrubbed with water to remove the hydrogen peroxide product. The working solution is treated with a nickel-silver catalyst and then blended with 10% hydrogenated working solution to take up liberated oxygen resulting from decomposition of hydrogen peroxide with nickel-silver. The purified solution is then returned for further hydrogenation thus completing one cycle.

During the hydrogenation reaction described above in the cycle a side reaction occurs of addition of hydrogen to the aromatic nucleus of ethylanthraquinone to form tetrahydroanthraquinone in an amount of about less than 0.5% based on the total ethylanthraquinone. The cyclic operation is repeated until 10% of the quinone compound is converted to the tetrahydro form. Thereafter, in each succeeding cycle about 20% of the purified working solution is withdrawn prior to introduction into the hydrogenator and this portion of the working solution heated in the absence of hydrogen but in the presence of 10% palladium to a temperature of 160° C. until the tetrahydro compound is reduced to a quinone form to about 5% by weight of the total quinone. The thus treated 20% portion of the working solution is commingled with the untreated working solution and the mixture sent to the hydrogenator for further cyclic operation in the process. In that manner the concentration of tetrahydroquinone is maintained at about 10% based on the total quinone content in the working solution.

Although certain preferred embodiments of the invention have been disclosed for purpose of illustration it will be evident that various changes and modifications may be made therein without departing from the scope and spirit of the invention.

We claim:

1. A cyclic process for the production of hydrogen peroxide which comprises hydrogenating an anthraquinone compound selected from the group consisting of alkylated anthraquinone and halogenated anthraquinone dissolved in a solvent to convert the anthraquinone compound to the corresponding anthrahydroquinone compound with concomitant formation as a side reaction of corresponding tetrahydroquinone compound resulting from the addition of hydrogen to the aromatic nucleus of the anthraquinone compound, subjecting the resultant hydrogenated solution to oxidation with elemental oxygen to convert the anthrahydroquinone compound to the anthraquinone compound and hydrogen peroxide, separating hydrogen peroxide from the solution, heating said solution to a temperature in excess of 100° C. in the substantial absence of hydrogen; i. e. less than a few mol percent of hydrogen and in the presence of a dehydrogenation catalyst selected from the group consisting of palladium and platinum to convert tetrahydroquinone compound back to the anthraquinone compound and recycling the resultant solution for further hydrogenation.

2. A process for the production of hydrogen peroxide which comprises hydrogenating an alkylated anthraquinone dissolved in a solvent to convert the alkylated anthraquinone compound to the corresponding alkylated anthrahydroquinone compound with concomitant formation as a side reaction of corresponding tetrahydroquinone compound resulting from the addition of hydrogen to the aromatic nucleus of the alkylated anthraquinone compound, subjecting the resultant hydrogenated solution to oxidation with elemental oxygen to convert the alkylated anthrahydroquinone compound to the alkylated anthraquinone compound and hydrogen peroxide, separating hydrogen peroxide from the solution, heating said solution to a temperature in excess of 100° C. in the absence of hydrogen and in the presence of a palladium catalyst to convert tetrahydroquinone compound back to the alkylated anthraquinone compound and recycling resultant solution for further hydrogenation.

3. A cyclic process for the production of hydrogen peroxide which comprises hydrogenating an anthraquinone compound selected from the group consisting of alkylated anthraquinone and halogenated anthraquinone dissolved in a solvent to convert the quinone compound to the corresponding alkylated anthrahydroquinone compound with concomitant formation as a side reaction of corresponding tetrahydroquinone compound resulting from the addition of hydrogen to the aromatic nucleus of the alkylated anthraquinone compound, subjecting the resultant hydrogenated solution to oxidation with elemental oxygen to convert the alkylated anthrahydroquinone compound to the alkylated anthraquinone compound and hydrogen peroxide, separating hydrogen peroxide from the solution, heating a minor portion of said solution to a temperature in excess of 100° C. in the substantial absence of hydrogen; i. e. less than a few mol percent of hydrogen and in the presence of a dehydrogenation catalyst selected from the group consisting of palladium and platinum to convert tetrahydroquinone compound back to the anthraquinone compound and recycling resultant solution for further hydrogenation.

4. A cyclic process for the production of hydrogen peroxide which comprises hydrogenating in the presence of a palladium catalyst an alkylated anthraquinone dissolved in a solvent to convert the alkylated anthraquinone compound to the corresponding alkylated anthrahydroquinone compound with concomitant formation as a side reaction of corresponding tetrahydroquinone compound resulting from the addition of hydrogen to the aromatic nucleus of the alkylated anthraquinone compound, subjecting said hydrogenated solution to oxidation with elemental oxygen to convert the alkylated anthrahydroquinone compound to the alkylated anthraquinone compound and hydrogen peroxide, separating hydrogen peroxide from the solution, heating said solution to a temperature in excess of 100° C. in the absence of hydrogen; i. e. less than a few mol percent of hydrogen and in the presence of a palladium catalyst to convert tetrahydroalkylated anthraquinone compound back to the quinone compound, and recycling resultant solution without separation of the palladium catalyst for further hydrogenation of the alkylated anthraquinone compound to the corresponding alkylated anthrahydroquinone compound.

5. A cyclic process for the production of hydrogen peroxide which comprises hydrogenating an alkylated anthraquinone dissolved in a solvent to convert the alkylated anthraquinone compound to the corresponding alkylated anthrahydroquinone compound with concomitant formation as a side reaction of corresponding tetrahydroquinone compound resulting from the addition of hydrogen to the aromatic nucleus of the alkylated anthraquinone compound, subjecting the hydrogenated solution to oxidation with elemental oxygen to convert the alkylated anthrahydroquinone compound to the anthraquinone compound and hydrogen peroxide, separating hydrogen peroxide from the solution, maintaining a concentration of the tetrahydroquinone compound in the solution below about 10% based on the total alkylated anthraquinone compound in the solution by heating a portion of solution to a temperature in excess of 100° C., in the substantial absence of hydrogen; i. e. less than a few mol percent of hydrogen and in the presence of a dehydrogenation catalyst selected from the group consisting of palladium and platinum to convert tetrahydro alkylated anthraquinone compound back to the quinone compound and recycling resulting solution for further hydrogenation.

6. A process for the production of hydrogen peroxide which comprises hydrogenating in the presence of a palladium catalyst an alkylated anthraquinone compound dissolved in a solvent to convert the alkylated anthraquinone compound to the corresponding alkylated anthrahydroquinone compound with concomitant formation as a side reaction of corresponding tetrahydroquinone resulting from the addition of hydrogen to the aromatic nucleus of the alkylated anthraquinone compound, subjecting the resultant hydrogenated solution to oxidation with elemental oxygen to convert the alkylated anthrahydroquinone compound to the alkylated anthraquinone compound and hydrogen peroxide, separating hydrogen peroxide from the solution, maintaining the concentration of the tetrahydroquinone compound in the solution below about 10% based on the total alkylated anthraquinone compound in the working solution by heating a minor portion of the solution in the absence of hydrogen and in the presence of a palladium catalyst to convert tetrahydro alkylated anthraquinone compound back to the quinone compound, and recycling resultant solution without separation of the palladium catalyst for further hydrogenation to convert the alkylated anthraquinone compound to the corresponding alkylated anthrahydroquinone compound.

7. A cyclic process for the production of hydrogen peroxide which comprises hydrogenating at a temperature between about 25–50° C. in the presence of a palladium catalyst a solution comprising about a 10% solution of ethylanthraquinone in a equivolume mixture of xylene and methyl cyclohexanol to convert the ethylanthraquinone compound to the corresponding ethylanthrahydroquinone compound with concomitant formation as a side reaction of corresponding tetrahydroquinone compound resulting from the addition of hydrogen to the aromatic nucleus of the ethylanthraquinone compound, subjecting the resultant hydrogenated solution to oxidation with air at a temperature between about 25–50° C. to convert the ethylhydroquinone compound to the ethylanthraquinone compound and hydrogen peroxide, extracting hydrogen peroxide from the solution with water, maintaining the concentration of tetrahydroquinone compound in the solution below about 10% based on the total anthraquinone content in the solution by heating a minor portion of the solution in the absence of hydrogen and in the presence of a palladium catalyst to a temperature in excess of 150° C. to convert the tetrahydroquinone compound back to the anthraquinone compound, and recycling resultant solution together with the palladium catalyst for further hydrogenation of the ethyl anthraquinone to ethylanthrahydroquinone.

8. A cyclic process for the production of hydrogen peroxide which comprises hydrogenating at a temperature between about 25–50° C. in the presence of a nickel catalyst a solution comprising about a 10% solution of 2-ethylanthraquinone in an equivolume mixture of xylene and methyl cyclohexanol to convert the ethylanthraquinone compound to the corresponding ethylanthrahydroquinone compound with concomitant formation as a side reaction of corresponding tetrahydroquinone compound resulting from the addition of hydrogen to the aromatic nucleus of the ethylanthraquinone compound, separating the nickel catalyst from the resultant hydrogenated solution, subjecting the hydrogenated solution to oxidation with air at a temperature between about 25–50° C. to convert the ethylanthrahydroquinone compound to the ethylanthraquinone compound and hydrogen peroxide, extracting hydrogen peroxide from the solution with water, maintaining the concentration of tetrahydroquinone compound in the solution below about 10% based on the total anthraquinone content in the solution by heating a minor portion of the solution in the absence of hydrogen and in the presence of a palladium catalyst to a temperature in excess of 150° C. to convert tetrahydroquinone compound back to the anthraquinone compound, separating the palladium catalyst from the solution, and recycling resultant solution for further hydrogenation of the ethylanthraquinone to ethylanthrahydroquinone.

9. In a cyclic process for the production of hydrogen peroxide involving the reduction of an anthraquinone compound in a solution with concomitant formation as a side reaction of corresponding tetrahydroquinone, and oxidation of the resultant anthrahydroquinone compound to produce hydrogen peroxide, the improvement which comprises heating the solution to a temperature in excess of 100° C. in the substantial absence of hydrogen; i. e. less than a few mol percent of hydrogen and in the presence of a dehydrogenation catalyst selected from the group consisting of palladium and platinum to convert the tetrahydroquinone compound back to the anthraquinone compound and recycling resultant solution for further hydrogenation.

References Cited in the file of this patent

UNITED STATES PATENTS 2,369,912    Pfleiderer et al. ---------- Feb. 20, 1945